(12) United States Patent
Iguchi et al.

(10) Patent No.: US 7,162,500 B2
(45) Date of Patent: Jan. 9, 2007

(54) MEMORY MEDIA ARCHIVING SYSTEM AND OPERATING METHOD THEREFOR

(75) Inventors: Hiroaki Iguchi, Odawara (JP); Tamon Mashimo, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 328 days.

(21) Appl. No.: 10/127,975

(22) Filed: Apr. 22, 2002

(65) Prior Publication Data
US 2003/0167288 A1    Sep. 4, 2003

(30) Foreign Application Priority Data
Feb. 15, 2002    (JP) .............................. 2002-037606

(51) Int. Cl.
*G06F 12/00* (2006.01)
(52) U.S. Cl. .................... 707/203; 707/204; 707/10; 707/3
(58) Field of Classification Search ................ 707/2–4, 707/9–10, 104.1, 204; 709/203, 219
See application file for complete search history.

(56) References Cited

U.S. PATENT DOCUMENTS

| | | | | |
|---|---|---|---|---|
| 5,317,728 A | * | 5/1994 | Tevis et al. ................. | 707/204 |
| 5,564,037 A | * | 10/1996 | Lam ............................ | 711/161 |
| 5,761,500 A | * | 6/1998 | Gallant et al. ................ | 707/10 |
| 5,813,009 A | * | 9/1998 | Johnson et al. ............. | 707/100 |
| 5,884,298 A | * | 3/1999 | Smith et al. ................... | 707/2 |
| 6,101,506 A | * | 8/2000 | Ukai et al. .................. | 707/203 |
| 6,647,399 B1 | * | 11/2003 | Zaremba ..................... | 707/204 |
| 2002/0138504 A1 | * | 9/2002 | Yano et al. ................. | 707/204 |
| 2003/0167288 A1 | * | 9/2003 | Iguchi et al. ............... | 707/203 |
| 2005/0108735 A1 | * | 5/2005 | Need et al. ................. | 719/331 |
| 2005/0216788 A1 | * | 9/2005 | Mani-Meitav et al. ......... | 714/6 |

FOREIGN PATENT DOCUMENTS

JP    10-254629    9/1998

* cited by examiner

*Primary Examiner*—Jean M. Corrielus
(74) *Attorney, Agent, or Firm*—Townsend and Townsend and Crew LLP

(57) ABSTRACT

A memory media archiving and management system is provided in which data entrusted for archiving by a user can be rapidly retrieved. The memory media archiving system receives a memory media archiving request from a user to archive memory media. A database stores information relating to archiving locations for the memory media. That database receives from the user, via a communication line, volume names established for each of the memory media to be archived, and identifying information corresponding to the volume names. The system holds the information in association with information relating to archiving locations for the memory media.

14 Claims, 8 Drawing Sheets

FIG.1

FIG.2 MEDIA DEPOSITING PROCEDURE

FIG.3 DATA DOWNLOAD PROCEDURE

FIG.6

LOG-IN ENTRY

USER ID : ☐

PASSWORD : ☐

[EXECUTE]

FIG.7

KEYWORD

☐ [SEARCH]

FIG.8

LIST OF SEARCH RESULTS

| SELECT | ARCHIVE NAME | VOL-SER# | KEYWORD |
|---|---|---|---|
| ☑ | #2-1 | AB0001 | CONTROLLER, DRAWINGS 1-3 |
| ☑ | #2-1 | AB0002 | CONTROLLER, DRAWINGS 4-6 |
| ☑ | #2-1 | AB0003 | CONTROLLER, DRAWINGS 7-9 |
| ☐ | #2-2 | XY0001 | SMALL RAID, DRAWINGS 1-4 |

[EXECUTE]

FIG.9

TRANSFER DESTINATION ADDRESS DESIGNATION SCREEN

| TRANSFER ORIGINATOR | #2-1 | AB0001 | CONTROLLER, DRAWINGS | |
|---|---|---|---|---|
| TRANSFER DESTINATION | FACILITY NAME | STR3@HTC-KK | VOL NAME | VOL001 |

| TRANSFER ORIGINATOR | #2-1 | AB0002 | CONTROLLER, DRAWINGS | |
|---|---|---|---|---|
| TRANSFER DESTINATION | FACILITY NAME | STR3@HTC-KK | VOL NAME | VOL001 |

| TRANSFER ORIGINATOR | #2-1 | AB0003 | CONTROLLER, DRAWINGS | |
|---|---|---|---|---|
| TRANSFER DESTINATION | FACILITY NAME | STR3@HTC-KK | VOL NAME | VOL001 |

EXECUTE

FIG.10

| MNEMONIC CODE | WWN ADDRESS |
|---|---|
| STR1@HTC-KK | 10:00:00:A0:99:80:02:36 |
| STR2@HTC-KK | 10:00:00:A0:99:80:02:37 |
| STR3@HTC-KK | 10:00:00:A0:99:80:02:60 |
| STR4@HTC-KK | 10:00:00:A0:99:80:02:61 |
| RAID001@odawara-kk | 10:00:00:A0:99:80:11:20 |
| RAID002@odawara-kk | 10:00:00:A0:99:80:11:21 |
| RAID003@odawara-kk | 10:00:00:A0:99:80:11:22 |

| | VOL-SER# | KEYWORD | MEDIUM |
|---|---|---|---|
| | \multicolumn{3}{c}{AUTOMATIC ARCHIVE REGISTRATION REQUEST} | |
| 1 | AB001 | CONTROLLER, DRAWINGS 1-3 | ☑DDS3 ☐DDS4 |
| 2 | AB002 | CONTROLLER, DRAWINGS 4-6 | ☑DDS3 ☐DDS4 |
| 3 | AB003 | CONTROLLER, DRAWINGS 7-9 | ☑DDS3 ☐DDS4 |
| 4 | | | |
| 5 | | | |

SEND

MEMORY MEDIA ARCHIVING SYSTEM AND OPERATING METHOD THEREFOR

BACKGROUND OF THE INVENTION

1. Field of the Invention

This invention relates to a memory media archiving system and more particularly to a system and operating method wherewith even large capacity files can be efficiently subjected to archiving management.

2. Description of the Related Art

Conventionally, manufacturers and other companies have needed to preserve enormous volumes of data for a certain period of time or longer, such data including accounting data subject to audit, process management data, design CAD data, LSI data, and other data. However, due to the enormous volume of these data and the low frequency wherewith they are accessed, such companies have been faced with a problem in that the storage space and the like required for managing data is costly, adversely affecting profits.

There are archive keeping service providers the business whereof is to resolve the problem noted above by keeping memory media wherein archive data are stored. In this archive keeping service, the client company itself stores enormous amounts of data on memory media such as magnetic tape (MT) or optical disks or the like, places certain quantities of such memory media in cardboard cartons or the like, affixes management information such as serial numbers to those cardboard cartons, and entrusts the keeping thereof to the archive keeping service provider. The provider archives the entrusted memory media at a location where land prices are low and high storage costs are not incurred, such as in remote mountainous areas.

When the entrusting company needs entrusted data, that company notifies the archive keeping service provider of the relevant serial number or other management information, and requests the return of the group of memory media placed in the cardboard carton or the like. The archive keeping service provider uses a truck or the like to return to the company the memory media group placed in the cardboard carton or the like coinciding with the designated management information. Companies, by using archive keeping service providers such as described above, have implemented archiving at low cost for enormous quantities of data which need to be preserved for a certain period of time or longer and require infrequent access.

With the archive keeping service described above, however, data are subjected to single-batch management by multiple memory media units placed in cardboard cartons or the like. Accordingly, the client must manage which memory media the needed data exist in, which has been a problem.

In order to obtain needed data, clients have had to obtain not only those data, but have had to designate memory media groups in units of cardboard cartons or the like wherein the data are placed.

Furthermore, because physical transportation using a truck or the like must be depended on for the method of obtaining data, it has been impossible to obtain necessary data in a short time or in real time.

In order to resolve such problems as these, making provision for accessing archive data stored on portable media via a network, as disclosed in Japanese Patent Application Laid-Open No. H10-254629/1998 and elsewhere, is being proposed.

SUMMARY OF THE INVENTION

However, methods such as the one disclosed in Japanese Patent Application Laid-Open No. H10-254629/1998 are not able to cope with files configured of enormous volumes of data such as will not fit in one memory medium. Moreover, because information that is easily managed with such memory media as these by a client who is a user differs from information needed for the memory media archiving system to efficiently retrieve memory media that it is archiving, this is not necessarily what could be called an easy system for the user to use.

With the present invention, in order to resolve the problems noted in the foregoing, a memory media archiving system managed and operated by a memory media keeping provider has a memory media search database wherewith memory media can be searched for by the client as well. That database is configured by, in addition to information comprising memory media specifying memory media names obtained from the user and identifying information added to each memory medium by the user, information indicating the location where the system on the provider end is archiving those memory media.

With the present invention, moreover, by adding an autoloader to the configuration of the memory media archiving system, data on a memory media medium designated by a user can be downloaded over a network, whereupon means are comprised for obtaining needed memory media information at high speed or immediately.

In another embodiment of the present invention, not only is the physical medium of the media itself archived, but, by providing a storage facility on the provider end, the configuration is made so that it is also possible to archive the actual data which are stored in the memory media. In such a case as this, a database relating to the archiving of memory media data, and respective databases for the archiving of the memory media themselves, to make archiving management easy, are provided.

In the present invention, by sharing a volume management database commonly between the provider and the client, the client can specify data which he or she wishes to obtain by a keyword readily recognizable by the client himself or herself, and subsequent access to data already entrusted can be made easy. Also, only the information needed can be immediately obtained, making it possible to effect efficient data management.

Meanwhile, the provider, based on information from the user, is able to immediately be aware of the location where that memory media are archived, and fast data presentation is possible. The target that this client can view is the volume management database, and not the data on the memory media per se, thus making it possible to prevent both data destruction due to an erroneous operation by the client and wrongful acquisition of data by a third party of ill intent.

Also, by providing volume management databases in client units, security functions can be further improved. And, when implementing the archiving of client data at a storage facility of the provider, instead of holding the memory media of the client while deploying and managing them directly at a warehouse, the volume name established by the client and the corresponding address at the storage facility are held in the database, wherefore control at the storage facility of the provider is made easy. In this case also, the client, at his or her end, can specify needed information, based on corresponding keywords or other information the content whereof can be recognized, wherefore no stress is ever felt in searching for information.

Furthermore, by adding a program for generating volume names in order to support the production of client volume names, not only is client workload lightened, but occurrences such as data loss or erroneous operation in the system overall due to a redundant volume name or the like can be prevented.

DESCRIPTION OF THE PREFERRED EMBODIMENTS

Figure 1:
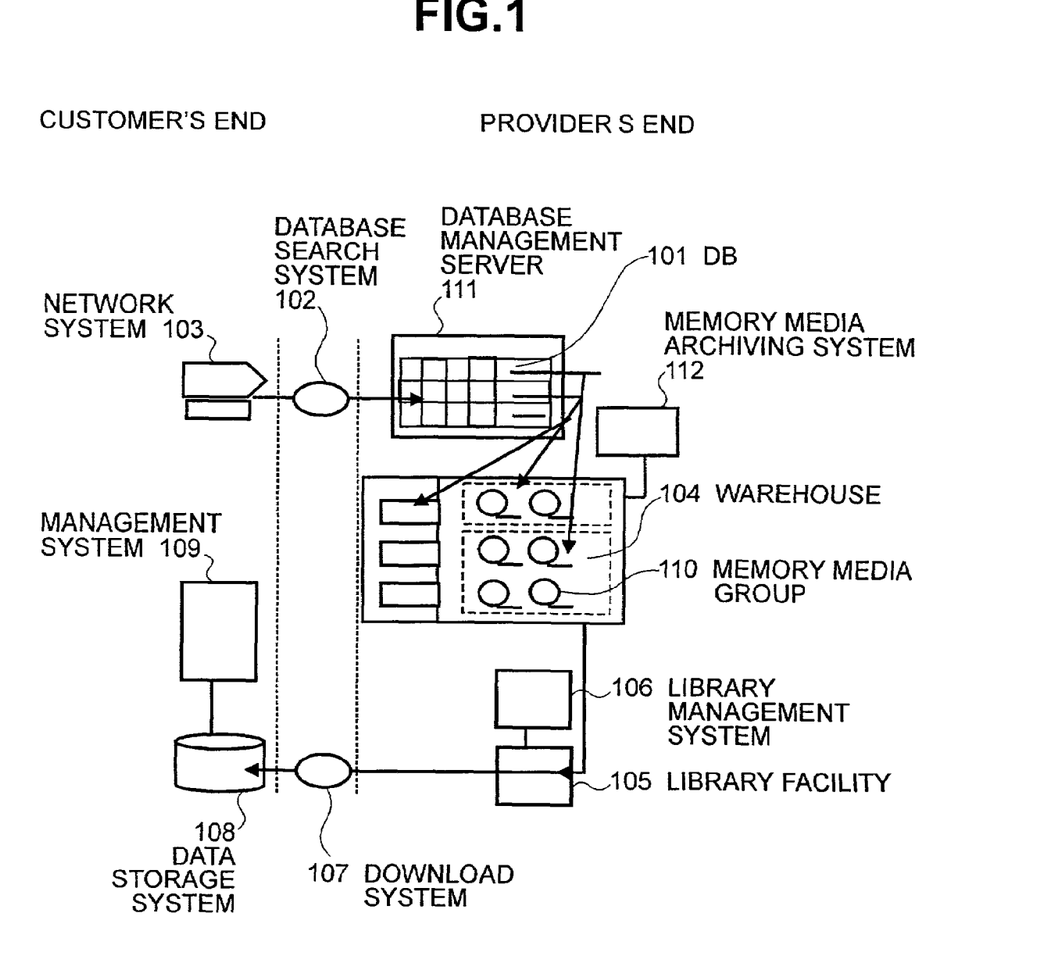
FIG. 1 is a simplified configuration diagram of a memory media archiving management system according to an embodiment of the present invention.

Embodiments of the present invention are now described. In FIG. 1 is diagrammed one configuration example of the memory media archiving system in the present invention, divided between two sides, one for the client who is the user, and the other for the provider who provides the service wherein this system is operated. In FIG. 1, item 101 is a volume management database. The client, using a database search system 102 which the client himself or herself downloads over a network and uses, performs searches of this volume management database 101 which is stored inside a database management server 111.

Item 103 is a wide area network computer system on the client's end which user the Internet or WAN or the like. Through this network computer system, the client transmits login information to the database 101, and sends and receives search keywords and search results and the like. Item 104 is a warehouse for the archiving of memory media received from clients. Therein, a plurality of memory media 110 is stored and managed, group by group. Each of this plurality of memory media groups has a plurality of media received from a client, for example, and comprises at least one medium. The memory media in this warehouse 104 are managed by a memory media archiving system 112 in units of memory media groups which each contain a plurality of memory media.

This warehouse can also be configured so that the memory media themselves received from clients are managed, or, as described further below, using a storage system belonging to the provider, the data themselves on the memory media received from clients are copied and preserved in that storage system. In that case, the clients' memory media themselves are archived at a warehouse in another location after producing management information therefor.

Item 105 is a library facility wherein are loaded the memory media groups archived in the warehouse 104. Item 106 is a library management system for managing that library facility 105. Item 107, which is a download system for downloading data, carries out the downloading of data from the library facility 105. Item 108 is a data storage system for storing data that have been downloaded. Item 109 is a management system for managing the data storage system 108.

Figure 2:
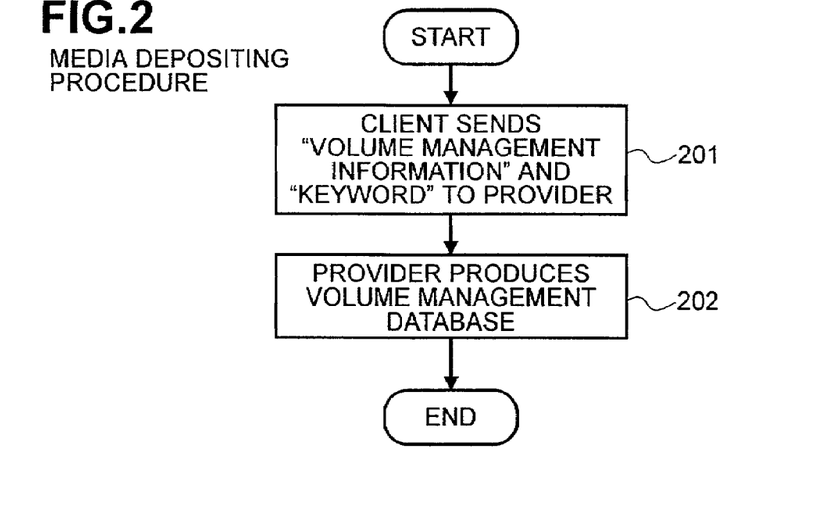
FIG. 2 is a diagram representing procedures taken when depositing memory media in the present invention.

In FIG. 2 are charted procedures when data reception is begun in an archive keeping service wherein the present invention is used. In the flowchart given in FIG. 2, when a client commissions the archiving of memory media to the provider, the client imparts a volume name to the memory media for which management is being commissioned. Together with such volume management information, the client transmits a search keyword used when searching for that volume to the equipment on the provider's end via the network 102 (step 201).

The equipment on the provider's end, using those data transmitted from the client's equipment, produces the volume management database 101 (step 202). This volume management database is produced by imparting position information indicating which position in the warehouse 104 the memory media of that volume name are located to the combination of the volume name of the memory media received from the client and the keyword therefor.

A description is given here of a case where a client bundles together a plurality of media and entrusts that to a provider. Ordinarily, when depositing such archive data, the client requests deposit after bundling together a plurality of media, for example, in a cardboard carton or the like. The archive # indicated in FIG. 4 is an archive name imparted to each of the media groups for which a bundled request like this is made.

Figure 4:
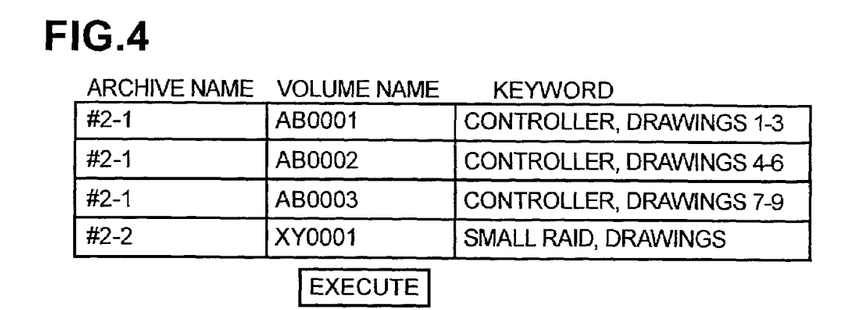
FIG. 4 is a diagram representing an example of a volume management database in an embodiment of the present invention.

In FIG. 4, AB0001, AB0002, and AB0003 are represented as being deposited as a bundle. On the provider's end, it is permissible to produce a volume management database by imparting position information indicating the location where archived, but it is also possible, using this archive name, and using corresponding information noting which position in the warehouse the media group of that archive name is located in, to provide so that archiving positions are managed in the warehouse. Because media groups requested as bundles by archive name in this manner can be distinguished between, the client can easily specify data he or she wishes to retrieve.

The provider performs archiving management at the warehouse 104 in units of these memory media groups. As to what position in the warehouse the archiving is done, a management table may be produced wherein a position in the warehouse is associated with the archive name, and management performed on the memory media archiving system 112, or provision may be made so that data are held by the database management server 111. In that case, the provider collects a memory media management fee from the client commensurate with the volume of the memory media entrusted and the length of the management term.

Figure 3:
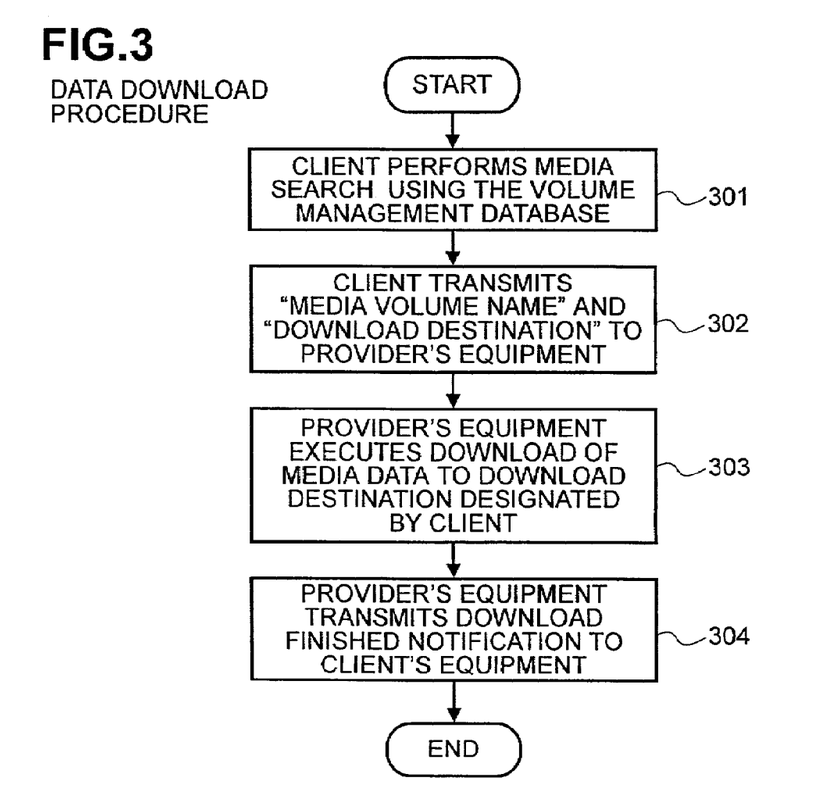
FIG. 3 is a diagram of procedures taken when downloading entrusted memory media in the present invention.

Next, making reference to FIG. 3, the procedures employed when using data in memory media entrusted by a client are described. By data usage here is meant searching for, referencing, or downloading data, or the like. First, the client, on a network computer system belonging to that client himself or herself, starts up the database search program 102, and performs a word search using a keyword transmitted in step 201, described earlier, for data deposited into the volume management database 101. By that search, the volume name of the extracted memory media wished to be downloaded is specified (step 301).

The client transmits that specified volume name and the download destination to the provider via the network (step 302). The provider receives the designated volume name from the client, and specifies the archive media group 110 in the warehouse containing that volume, using the warehouse management server 112 (step 303). The provider then loads the specified memory media into the library facility 105, either automatically or by hand, and the library management system 106, in accordance with the received client request, downloads the designated volume data to the download destination designated by the client (step 303). In this case, as described earlier, when the warehouse is configured by a storage facility, needed data are selected from a storage address associated with the archive name or volume name.

Alternatively, the client can designate an archive name, and request download of data in media group units. When the download has finished, the library management system 106 transmits data to the client to inform that the download has been completed (step 304). For this data communication, an automatic notification may be made after the download is finished, using a program in the library management system, or provision may be made for making notification in accordance with a program loaded in another management system.

The provider collects data download fees from the client according to the frequency of download and the data volume and the like.

The processing procedures implemented when the client entrusts the management of an archive media group to the provider is now described in even greater detail. First, the client imparts a unique user volume name to the optical disk, tape, or other memory medium whereon data are stored, and the memory medium itself, with the volume name imparted, is sent to the provider. Here, depositing and retrieval can be facilitated by depositing memory media after bundling them together in a prescribed cardboard carton or the like.

In such cases as this, it is preferable that those memory media be given a common archive name and treated as one bundle. That archive name may be determined such that equipment on the provider's end imparts the common archive name to that which the client has bundled together and requested to be accepted on deposit, or provision may be made so that a common archive name is imparted to each memory media group bundled and deposited at the client's end beforehand. When prescribed container boxes such as cardboard cartons or the like are used, as described in the foregoing, in particular, the common archive name is imparted to each of those container boxes.

In the facilities on the provider's end, the archive names, and data wherein are associated actual archiving positions in the warehouse, are held, and memory media group retrieval requests from the client are handled. The client also produces a keyword for specifying a memory media user volume name. That keyword is transmitted to the provider via the network paired together with the volume name.

That keyword need only be an identifier capable of identifying data which the user himself or herself has stored in memory media. Here, the memory media used by the client may be memory media capable of being loaded in the library facility, such as optical disks or tapes or the like, or they may be memory media for which no library facility exists.

When the archive name is also set on the client's end, the archive name is sent together therewith. Then, the management system on the provider's end builds the volume management database 101, based on the user volume name and the keyword paired with that user volume name transmitted from the client. The provider imparts archiving position information indicating the archiving location in the warehouse 104 where the archives are preserved to each user volume name for the memory media received from the client, and places the memory media stored at an actual position in the archive warehouse that corresponds with that archiving position information.

Here, when the archive warehouse is configured by a storage system, the addresses in the storage system where memory media data are stored can be used as archive names in archiving position information (addresses on memory media).

Next, FIG. 4 is a diagram of a first embodiment of the volume management database of the present invention. Using this FIG. 4, a volume management database that comprises volume names, keywords, and archive names is described. As described earlier, the user volume names and keywords are transmitted from a client to a provider via a network.

The user volume name is a unique name imparted to each memory media by the client, while the keyword is paired with that volume name, being a word group that a user can recognize for specifying that volume. In FIG. 4, the unique numbers AB0001, AB0002, and AB0003 are user volume names imparted by the user. To these three volumes is imparted the identical archive name #2-1, indicating that AB0001, AB0002, and AB0003 have been deposited as one bundle.

More specifically, this is a number that is imparted commonly to a plurality of media placed in the same container box. Equipment on the provider's end associates information on actual archiving positions in the warehouse with each of these archive names and configures a database. In this case, media groups having identical archive names indicate that those media are stored in the same section of the warehouse 104.

Such a management method as this is effective in cases where files are very large and cannot be stored on one memory medium. In the case of data spanning a plurality of memory media, by imparting the same keyword, when the user searches for a needed memory media volume, it is possible to find all of the needed volume names with the keyword alone.

The terms "archive name," "volume name," and "keyword" are now described in even greater detail. The "archive name" is a unique value for each media group in the warehouse. For the "volume name," a number is imparted that will not be duplicated in the same "archive name" (i.e. media group). The "keyword" constitutes an "archive name"+"volume name" pair, and a unique "keyword" is imparted to every "archive name-volume name" row. Thus it is possible for the client to pull out a unique "archive name" and "volume name" by implementing a "keyword" search.

For this volume name, as described in the foregoing, the user volume name received from the client can be used as is, but it is also possible for the provider, based on those data, to separately generate a provider management volume name, and make that the volume name in the database. In that case, it is possible for the client to search for a volume having needed data by keyword information.

The volume name is now described. The volume name need only be a unique value set by the user. However, in cases such as where voluminous data span a plurality of memory media, it is preferable that consecutive numbers be contained in the end, so that those memory media can be understood to be related. Thereupon, by the provider and client agreeing beforehand on rules for imparting volume names, a volume management database can be built wherewith the provider's system will be capable of supporting more refined services.

In order to prevent a client from attaching duplicated volume names or the like, provision may furthermore be made so that a volume name which the client is seeking to use is first transmitted to the provider via the network as a temporary volume name and, after it has been confirmed that it does not coincide with a n existing volume name, that temporary volume name is imparted as the volume name to the memory media which is to be entrusted.

Provision may also be made so that, when there is no duplication or other error in establishing a volume name, the equipment at the provider's end which received that temporary volume name issues a bar code, wherein that volume name is recorded, to the client, whereupon the client outputs that bar code to a paper seal and attaches that to the memory media to be entrusted. That method is effective in cases such as where the library facility, described further below, is being automated. It is also possible for a plurality of "keywords" to be imparted to one "volume name." In addition, a "keyword" may be formed of a plurality of words, and may even be such as wherein text is registered.

Meanwhile, in the generation of a keyword unit, besides that which is registered by the client, the content of the memory media may be read in by the equipment on the provider's end, automatic "keyword" reading performed, and the volume management database built. This operation is called "auto-indexing." In generating the volume management database, moreover, the configuration can be made so that the user stores keywords or other identifying information in a prescribed area of the media being deposited, and that portion is automatically read out at the provider's end, thus promoting user convenience. In that case, because that keyword or other identifying information is stored in the memory medium itself, the user, when making registration, need not be aware of the volume name. The provider, out of concern for security issues and the like, produces the volume management database described above for each client (company), and implements management such that none of the several databases can be accessed without the corresponding client name or client ID or the like.

Figure 5:
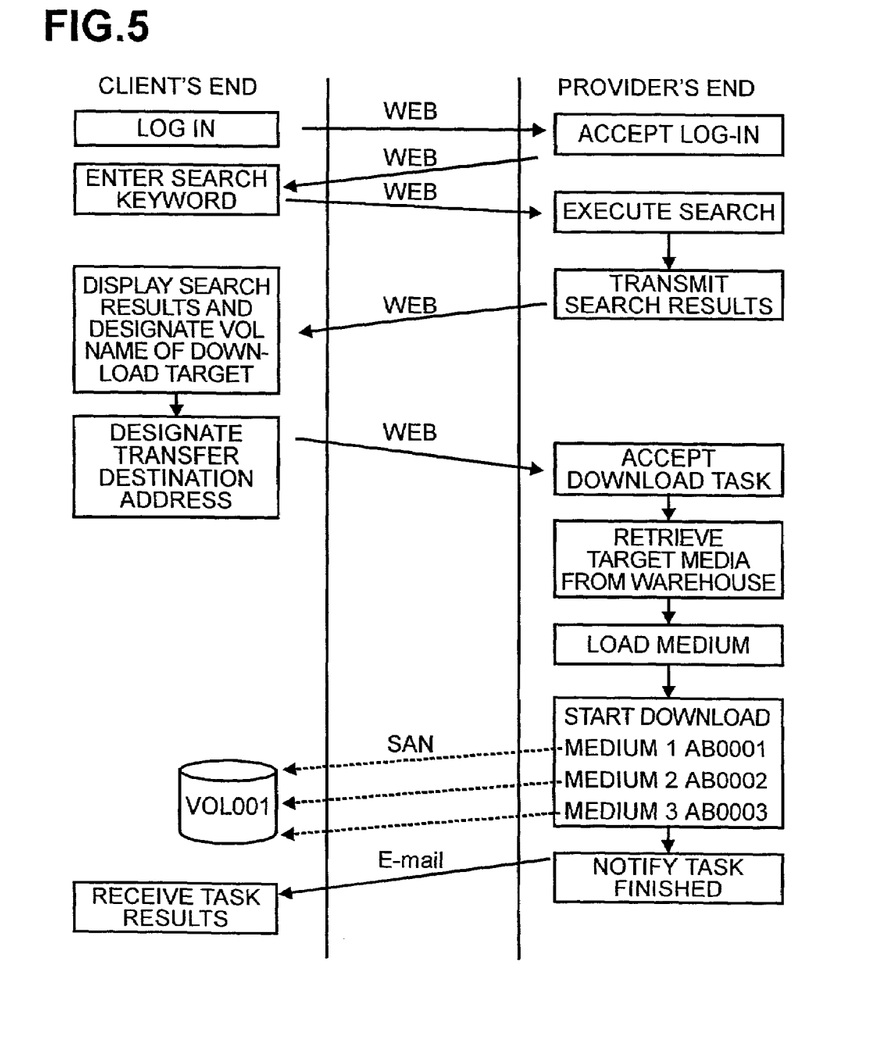
FIG. 5 is a flowchart of procedures for client volume search and data download in the present invention.

In FIG. 5 is given a flowchart for client volume search and download procedures. The client executes searches using a search terminal such as a PC or workstation (WS) or the like which is connected to a wide area network such as the Internet or a WAN whereon the database search system 102 can be used.

For the search execution input technique, (1) a technique that employs GUI input, using a Web system, and (2) a technique for performing searches with text input, using a mail system, may be cited. In this embodiment, the description which follows is for a technique employing GUI input, using a Web system.

Figure 6:
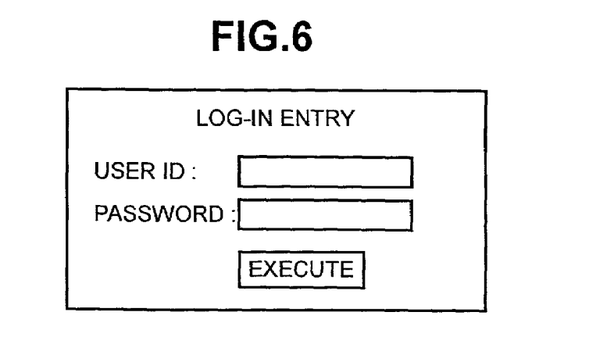
FIG. 6 is a diagram of an example of a screen for logging into a volume search site in the present invention.

First, the client logs into the volume search site of the provider. An example of a log-in screen for a volume search site is diagrammed in FIG. 6. With this screen, the client inputs a user name or user ID and a password and transmits those to the provider. The provider, based on those data, verifies whether the user is a registered user, accepts the log-in, and pulls out ancillary data such as the name of the company to which the user belongs. When the client data have been verified and log-in is established, the provider next transmits a search keyword input screen to the client.

Figure 7:
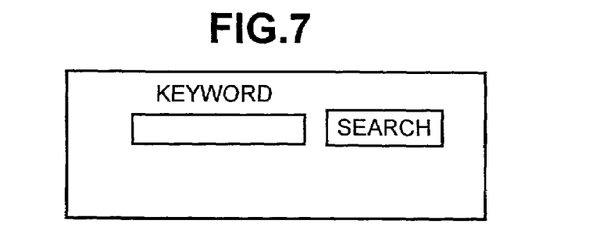
FIG. 7 is a diagram of an example of a keyword input screen for searching in the present invention.

An example of a search keyword input screen is diagrammed in FIG. 7. The client enters a search keyword and search conditions on this screen and transmits those to the provider. Following the input conditions, a search of the keyword area in the volume management database 101 is conducted, and the results of the search are extracted by the database management server 11 1. The database management server 111 transmits the results of this search via the database search system 102 of the client, whereupon the search results are displayed on the client's terminal.

Figure 8:
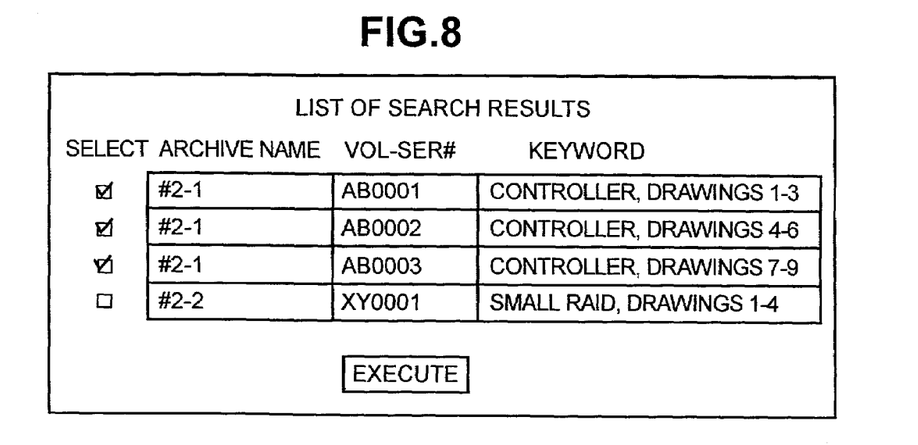
FIG. 8 is a diagram of an example of a screen showing volume search results in the present invention.

An example of such search results is given in FIG. 8. As indicated in this example, a listing of "archive names," "volume names," and "keywords" and the like is given. From the search results listing display the client may also, if necessary, add a new keyword and implement a narrowed search. Finally, at the point in time when the desired search results are output, the client puts a check in the selection box paired with the volume that is the target of the download to be executed, or highlights the display of the target volume box, and depresses the execute button, thereby designating the volume to be downloaded.

Figure 9:
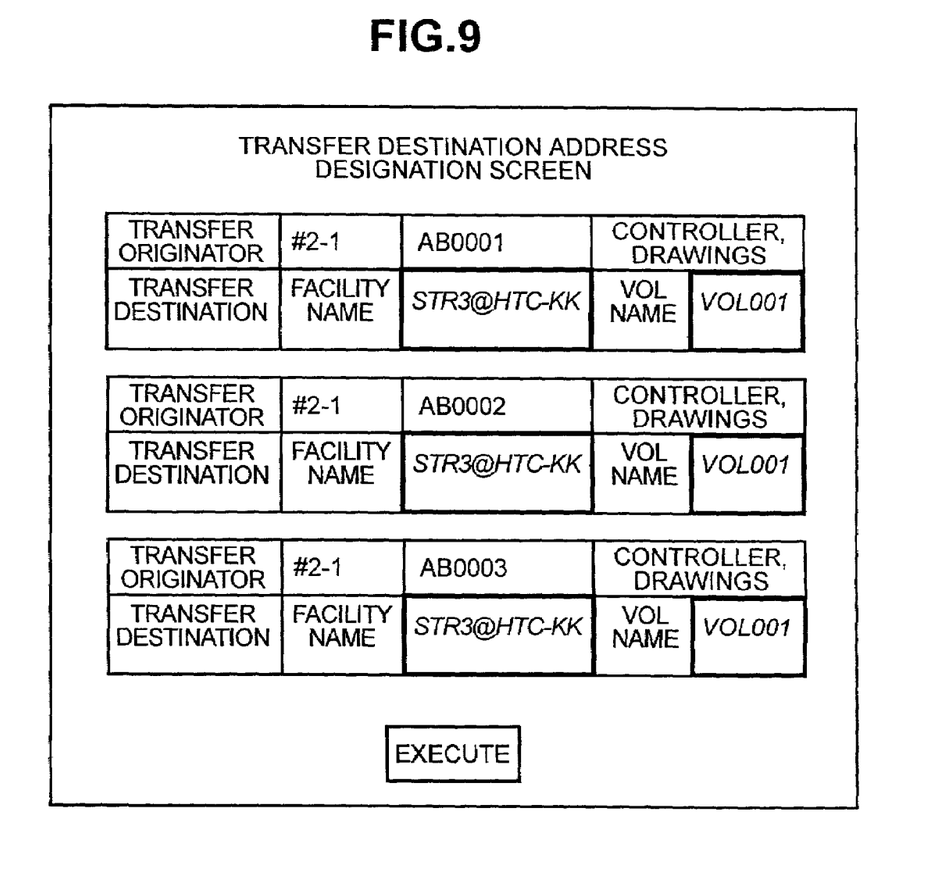
FIG. 9 is a diagram of an example of a transfer destination address designation screen in the present invention.

Based on those designated data, a transfer destination address designation screen is displayed as the input screen on the client's terminal. An example of this transfer destination address designation screen is diagrammed in FIG. 9. The "archive names," "volume names," and "keywords" of the transfer originator are displayed, and the client enters the "facility name" and "VOL name" of the transfer destination to which the download is to be made. In FIG. 9, an entry example is represented where data are downloaded using an SAN. For the facility name, the input port WWN address of the storage facility is designated.

Figure 10:
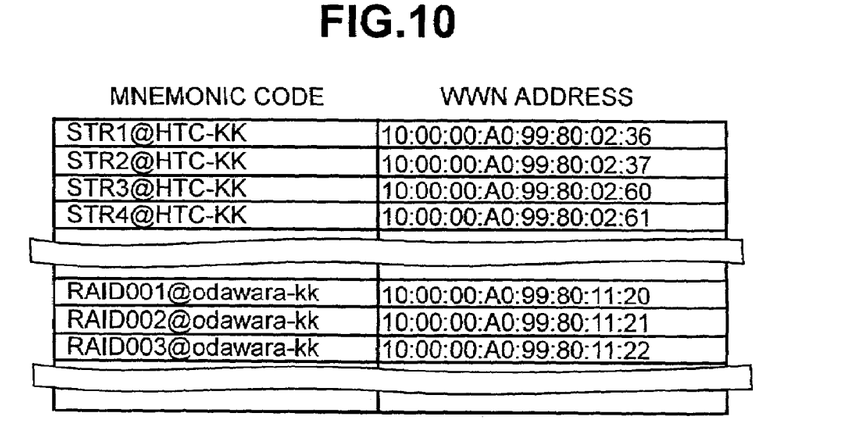
FIG. 10 is a diagram of an example of a WWN address-mnemonic conversion table in the present invention.

Here, instead of directly designating a WWN address, the storage facility at the download destination is specified using the WWN address mnemonic conversion table given in FIG. 10. This WWN address mnemonic conversion table is prepared by the client, and held in common by the client equipment and the provider equipment. Thus it is possible to input a WWN address with a mnemonic, and thereby specify a storage facility at the download destination. This registration may be established and registered as an option service when the customer makes a volume deposit. Also, to determine which volume in the specified storage facility is to be downloaded, the volume name is entered in the next VOL name entry box and the download destination volume is specified.

As another embodiment, there is also the method, when a download is to be executed by ftp or the like using a network, of designating the DNS server name or IP address of the server that is to implement the download, and designating the download destination volume name as the VOL name. With these "transfer destination address designation screens," the customer designates the "archive name," "volume name," and "transfer destination address" information for the download to be executed, and transmits that information to the provider. The provider receives the transferred data noted above, and starts the download operation. Details of the download operation are described further below.

Also, when receiving data, the library management system 106 checks the download destination, and, if the download destination does not actually exist, informs the database management server 111 of that fact. The database management server 111, with a Web screen, displays a warning screen in the database search system 102, informing the client that the download destination does not exist.

Figure 11:
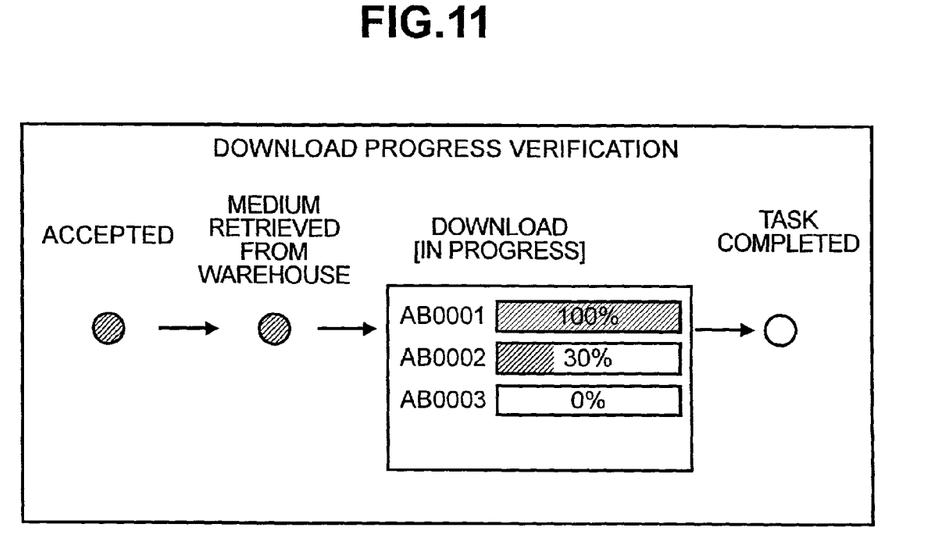
FIG. 11 is a diagram of an example of a screen displaying system conditions and download status in the present invention.

It is also made possible to verify, by the Web, the current system conditions and download status. An example of a display of the system conditions and download status is given in FIG. 11. A high-speed line such as an SAN, NAS, or dedicated line may be used for the line over which the download is effected, and that may also be done with a technique using an existing Internet line. If it is possible to send and receive the necessary information, the screens represented in FIGS. 6, 7, 8, 9, and 11 may be produced by the provider, or they may be produced by the client.

The procedures employed when loading the memory media 110 stored in the archive warehouse 104 into the library facility 105 are now described in detail. A provider receiving a download request from a client, from the "archive name" of the transfer originator that was sent, searches to determine in which position in the warehouse the media group having that archive name is stored. Using the results of that search, at least one memory medium of what is to be downloaded is selected from the archive media group stored in the warehouse. The selected memory medium or media are thereupon loaded into the library facility 105 manually.

In cases where the data to be downloaded are voluminous, configuring one database or file with a plurality of memory media, as described earlier, information indicating the relationship between those media is added according to a convention agreed upon between the client and the provider beforehand. One conceivable convention would be to add consecutive numbers at the end of the volume names as diagrammed in FIG. 4, for example. It is possible to provide a program, in the equipment at the provider's end, that, when determining a user volume name, will support the addition of the volume name of the user in accordance with such a convention.

When a bar code is used, it is possible, by adding information related to volume relationships to the bar code, and attaching that bar code to the memory media, to implement a configuration wherein that will be automatically recognized by the library facility. In that case, provision can also be made so that the order wherein the memory media are loaded in the library facility is not particularly questioned. When automatic recognition is not possible, the memory media are loaded into the library facility according to the "number added at the end of the volume name." At the point in time when registration of the memory media in the library facility is completed, the provider instructs the library management system 106 to begin downloading.

When a large loader system or robot or the like exists which will automatically perform the tasks described above, it is possible to completely automate the procedures described above. At the provider's where a download request is received from a client, the archive warehouse management system receives that information, and a robot or the like is instructed to load the designated memory media. When the memory media spans across a plurality of media, that memory media group is indicated. The robot that received the instruction loads that archive memory media group into the library facility.

At the point in time when the loading of the memory media into the library facility is finished, the archive warehouse management system instructs the library management system 106 to begin downloading. No matter which of the schemes described in the foregoing is used, at the point in time when the downloading is finished, the memory media are unloaded from the library facility and, referencing the database, returned to the position in the warehouse 104 corresponding to the archive name.

Also, as diagrammed in FIG. 9, when data stored in a plurality of memory media are downloaded to one download destination volume, the download is to be executed sequentially from the smallest transfer originator "volume name." The search results for the same "archive name," moreover, are to be displayed sequentially beginning from the smallest "volume name."

Provision is further made so that it is possible to download files in a volume instead of downloading the entire volume. When that is the case, the client sends to the provider download designating information to which a "file name" is added in addition to the "volume name." An added service may also be provided wherewith, when data are downloaded, the download is executed after changing the data code format of the original data of the download.

As means for realizing the particulars described in the foregoing, a data conversion is performed by the library management system 106 on the data in the library facility 105, and then the download is carried out to the data storage system 108 that is the download destination. Alternatively, the data conversion may be conducted by the management system 109. The conversion of data from EBC to ASCII, and data conversions from Word data to HTTP or PDF files may be cited as examples of data code conversion. A fee amount is changed according to the conversion code type and volume of data.

For the download line, in order to execute the download of high-capacity volume data, a high-speed data transfer line such as an SAN, NAS, or high-speed WAN or the like is used. When the client is a company or a government office or the like, a dedicated high-speed line may be installed between the provider and the client. However, when high speed is not demanded for the download, it is also possible to use an existing network such as the Internet.

When the download is finished, the library management system 106 notifies the client that the download is finished using mail or the like to the database search system 102 or to the management system 109. In addition, when the download has not finished normally, the library management system 106 makes notification of the download results. As an additional feature, the library management system 106 may also inform the client of the fact when a download is started.

Figure 12:
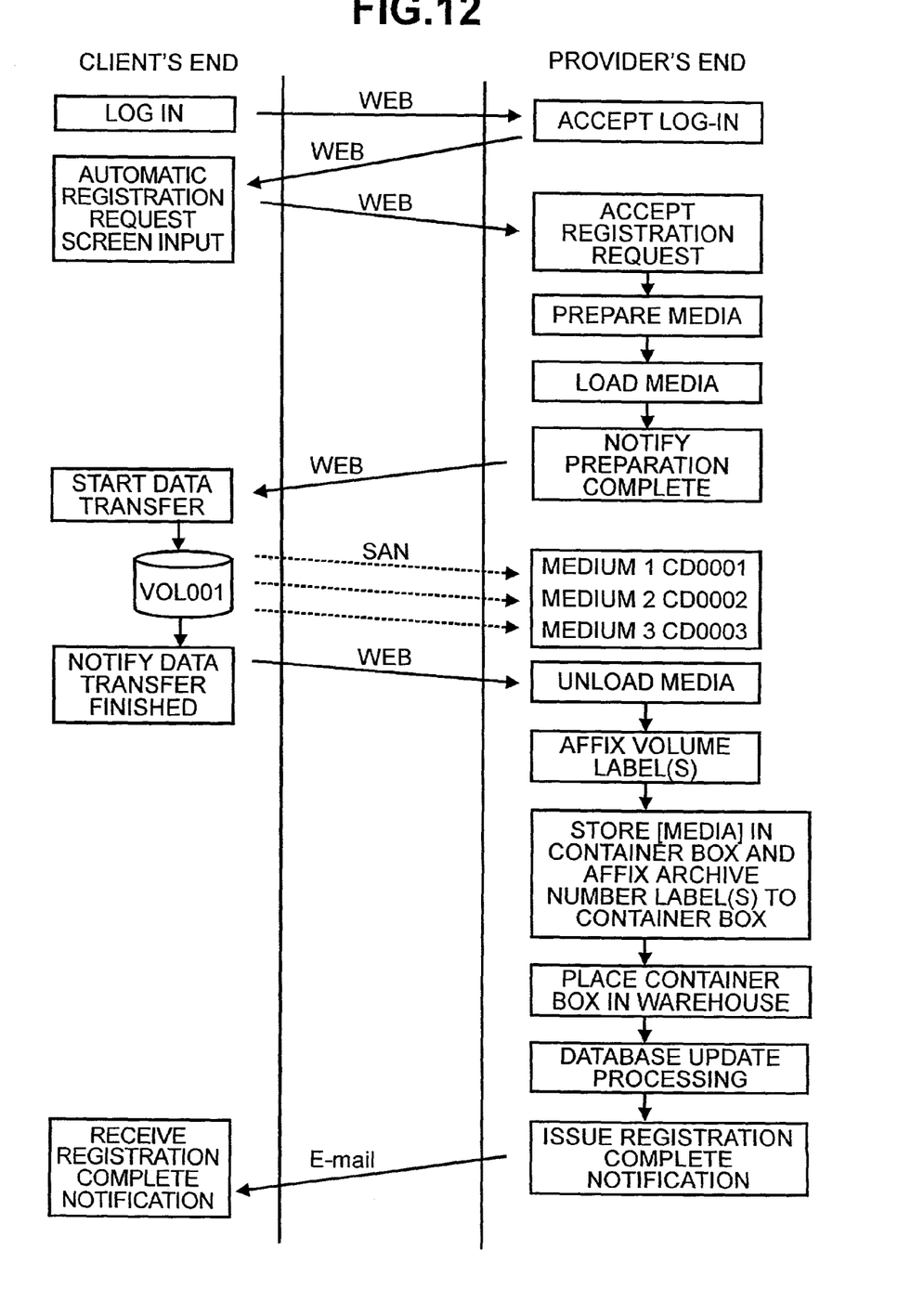
FIG. 12 is a flowchart of procedures taken when automatically registering data in some memory medium as archive data in another embodiment of the present invention.

In FIG. 12, a technique is described for effecting automatic data registration, when registering memory media data, using a high-speed data transfer line 107 from the client instead of having the client carry the memory media group to the provider. First, the client logs in from the database search system 102 to the database management server 111, and transmits a data registration request to the database management server. The server 111 that receives the data registration request transmits a screen (which is to be made a Web screen or automatic archive registration request screen) requesting the transmission of information such as the type of memory media used for the data and the required capacity to the database search system 102 of the client. The client, upon entering that information, sends a reply to the provider.

Figure 13:
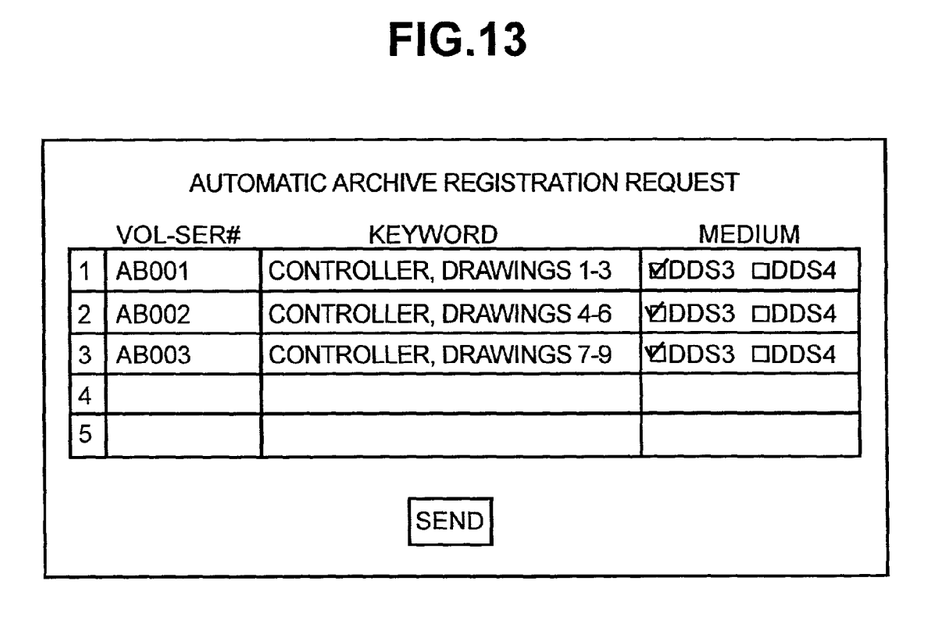
FIG. 13 is a diagram of an example of a screen for requesting the automatic registration of archive data in a second embodiment of the present invention.

An example of an automatic archive registration request screen is diagrammed in FIG. 13. In this screen, in addition to the type, numbers, and capacity and the like of the memory media, a "volume name" and "keyword" are entered and transmitted. The provider, upon receiving that information, prepares the memory media requested by the client, and loads them in the library facility 105.

At the point in time when that loading is concluded, the provider communicates to the client the fact that preparations have been made for transferring the archive data, using mail or the Web or the like from the database management server 111 or from the library management system 106. The client, upon receiving that communication, starts the data transfer to the memory media loaded in the library facility 105 of the data stored in the data storage system 108, using the management system 109.

At the point in time when the data transferred to the memory media reaches full capacity, the data transfer target is changed to the next memory medium, using the autoloader of the library facility 105, in response to an instruction from the library management system 106. It is also possible for the client to be cognizant of volume data breaks, and indicate a memory media change instruction to the library management system 106 from the management system 109.

At the point in time when all data transfer of client data is finished, the client, using mail or the Web or the like, communicates the fact that the data transfer is finished to the database management server 111, using the database search system 102. The provider, upon receiving that communication, performs the following tasks.

(1) The provider removes the memory media group from the library facility, and affixes "volume name" labels to the memory media in the order of the memory media for which data transfer was performed. (When the data transfer order is apparent, memory media to which "volume names" have been affixed beforehand may be loaded into the library facility.)

(2) The provider places the memory media group noted above into a container box, affixes an "archive name" label to the container box, and stores that memory media group in the archive management warehouse 104.

(3) The client sends data corresponding to the "volume name"-"keyword" to the vender (which data may be sent to the provider beforehand, prior to beginning the data transfer of the data). After warehousing the memory media group, the provider updates the volume management database 101 using those data and the "archive name" imparted to the memory media group.

(4) At the point in time when the processing described above is finished, the provider issues a registration completion notice by mail or the like to the client.

An additional service may be provided whereby, at the time of registration data transfer, archive data registration is effected after converting the data code format of the original data of the registration data. As means for effecting the particulars noted above, after performing data conversion in the management system 109 on the data of the data storage system 108, data transfer is carried out to the library facility 105 that is the download destination. Alternatively, data conversion may be performed by the library management system 106. The conversion of data from EBC to ASCII, and data conversions from Word data to HTTP or PDF files may be cited as examples of data code conversion. A fee amount is changed according to the conversion code type and volume of data.

An additional service may also be provided whereby, at the time of registration data transfer, the data registration medium is converted to another medium from the original medium of the registration data. By archiving data on disk to a tape, for example, disk backup is effected. Besides that, data conversion is effected from optical memory media to tape media. For the high-speed data transfer line 107, in order to execute the download of high-capacity volume data, a high-speed data transfer line such as an SAN, NAS, or high-speed WAN or the like may be used. When high speed is not demanded for the download, it is also possible to use an existing network such as the Internet.

The database in the present invention need not necessarily configure all of the information including the archive names, volume names, identifying information, and archiving position information in the warehouse corresponding thereto in the same file. The several databases themselves can be divided between what the provider uses and what the user uses and produced separately, in a configuration wherein a database indicating the relation therebetween is added thereto.

Needless to say, as described in this embodiment, in cases where the provider system, based on information transmitted from the user, generates one database shared between the provider and the user, it is only necessary to implement information masking so that, when the user searches that database, the information needed by the user, such as archive names, volume names, and identifying information, are displayed, and, when the provider searches the database, archive names, volume names, and information on actual archiving positions thereof in the warehouse are displayed.

By adding masking means for such information, when a database display is made, it becomes possible to mask information needed only for the management operations of the provider, which needs not be made known to the user, while, by the same token, the user can prevent such user-specific information as keywords from being displayed unconditionally on the display screen of a person on duty at the provider's end.

What is claimed is:

1. A memory media archiving system comprising a computer system configured to receive a memory media archiving request from a user over a communication line connected thereto and further configured to retrieve memory media having data provided by said user;

wherein said memory media archiving system comprises a database for storing information relating to physical archiving locations in a warehouse for said memory media; and said database holding information received from said user via a communication line which information includes volume names established for each of said memory media to be archived and identifying information corresponding to said volume names the identifying information being common for memory media deposited as a group, the archiving system storing the information in association with information relating to said physical archiving locations in the warehouse for the memory media; and wherein said user, from a location separate from the archiving system, is able to examine the database and the information received from said user, select by volume name or identifying information, including identifying information common for memory media deposited as a group, the archived information to be retrieved, and retrieve the selected archived information from the archiving system over a communications link.

2. The memory media archiving system according to claim 1, wherein said database is configured so that said user can view said database via a communication link.

3. The memory media archiving system according to claim 2, wherein said database is generated separately for each user, and, when said memory media archiving system receives a viewing request from said user, verification is made as to whether or not said user satisfies conditions of accessing the database.

4. The memory media archiving system according to claim 1, wherein said memory media archiving system, upon receiving a data transmission request from a user via said link, transmits a search tool for said user to search said database using said identifying information.

5. The memory media archiving system according to claim 4, wherein said memory media archiving system further comprises selection means for selecting memory media for which data are requested, from memory media information searched by said search tool, and said selected memory media information is transferred to a memory medium of the user using a communications link other than said link.

6. The memory media archiving system according to claim 4, wherein said memory media archiving system further comprises selection means for selecting memory media for which data transmission is requested, from memory media information searched by said search tool, and transfers selected memory media, after converting the format thereof, to a memory medium on the user's end.

7. The memory media archiving system according to claim 1, further comprising a database relating to archiving locations where actual physical media for said memory media are archived.

8. A memory media archiving system comprising a computer system configured to receive a memory media retrieval request from a user and further configured to retrieve organized memory media, the memory media being archived as separate memory media or as groups of memory media;
    wherein said memory media archiving system comprises a database for storing information relating to archiving locations for said memory media; and
    said database receives from said user, via a communication link, at least one of volume names established for each of said memory media to be archived, a group identification for a group of memory media archived, and information stored in said memory media, generates identifying information corresponding to said volume names or group identification, and holds the information in association with information relating to archiving locations for said memory media; and
    wherein said user is able to, from a location separate to the archiving system, examine the database and the information received from said user, select archived information to be retrieved, and retrieve the selected archived information from the archiving system over a communications link.

9. A method for operating a computer system of a memory media archiving system for receiving a memory media archiving request from a user and archiving memory media,
    wherein said computer system of said memory media archiving system is configured to performs steps of:
    a first step of receiving, via a communication link, volume names established for each memory media to be archived and identifying information corresponding to the volume names, the identification information including identification information common to a group of memory media for being retrieved in one operation, from the user;
    a second step of generating databases from the volume names and identifying information received in said first step and information relating to archiving locations where said memory media are to be archived; and archiving the memory media at the archiving locations.

10. The method according to claim 9, further comprising:
    a third step in which said memory media archiving system receives a database viewing request from said user; and
    a fourth step of determining whether or not said database viewing request is from a user authorized to view said database.

11. A system for archiving memory media in groups; comprising a computer system configured to receive, from a user, a request for archiving a memory media group including a plurality of memory media, and to archive the memory media group;
    wherein said system for archiving memory media in groups further comprises a database for storing said memory media group and for storing information received from said user in association with information relating to archiving locations for said media group;
    said database is configured to receive from said user, via a communication line, archive names established for each of said memory media groups to be archived, and identifying information corresponding to said archive names, and to hold the information in association with information relating to the archiving locations for said memory media groups;
    wherein said user is able to, from a location separate to the archiving system, examine the database and the information earlier received from said user, select archived information to be retrieved, and retrieve the selected archived information from the archiving system over a communications link.

12. The memory media group archiving system according to claim 11, wherein said database is configured so that said user can view the database via a communication line.

13. The memory media group archiving system according to claim 11, wherein said database receives from said user, via a communication line, volume names for each memory media included in said memory media groups, and identifying information corresponding to the volume names.

14. A memory media archiving system comprising a computer system configured to receive a memory media retrieval request from a user, via a network connected thereto and to enable retrieval of media desired by the user from the archiving location where memory media are archived,
    wherein said memory media archiving system comprises a database for storing information relating to said media archiving location and information received from said user, and identifying information corresponding to said memory media, the identifying information including information about a group of memory media to be retried;
    identifying information stored in a prescribed location in said memory media to be archived is read out and stored as said identifying information; and
    wherein said user is able to, from a location separate to the archiving system, examine the database and the information received from said user, select archived information to be retrieved, and retrieve the selected archived information from the archiving system over a communications link.

* * * * *